Patented Apr. 3, 1934

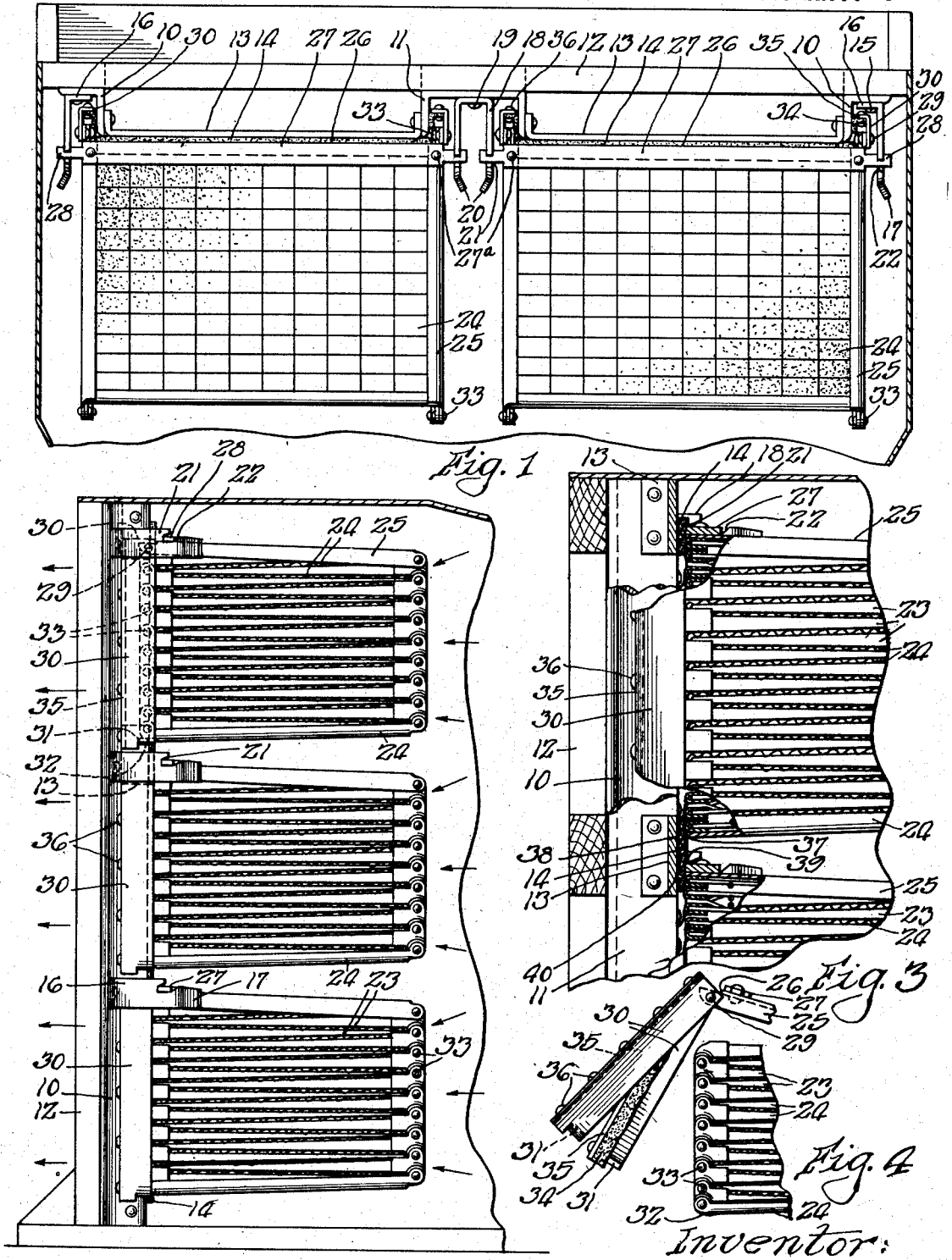

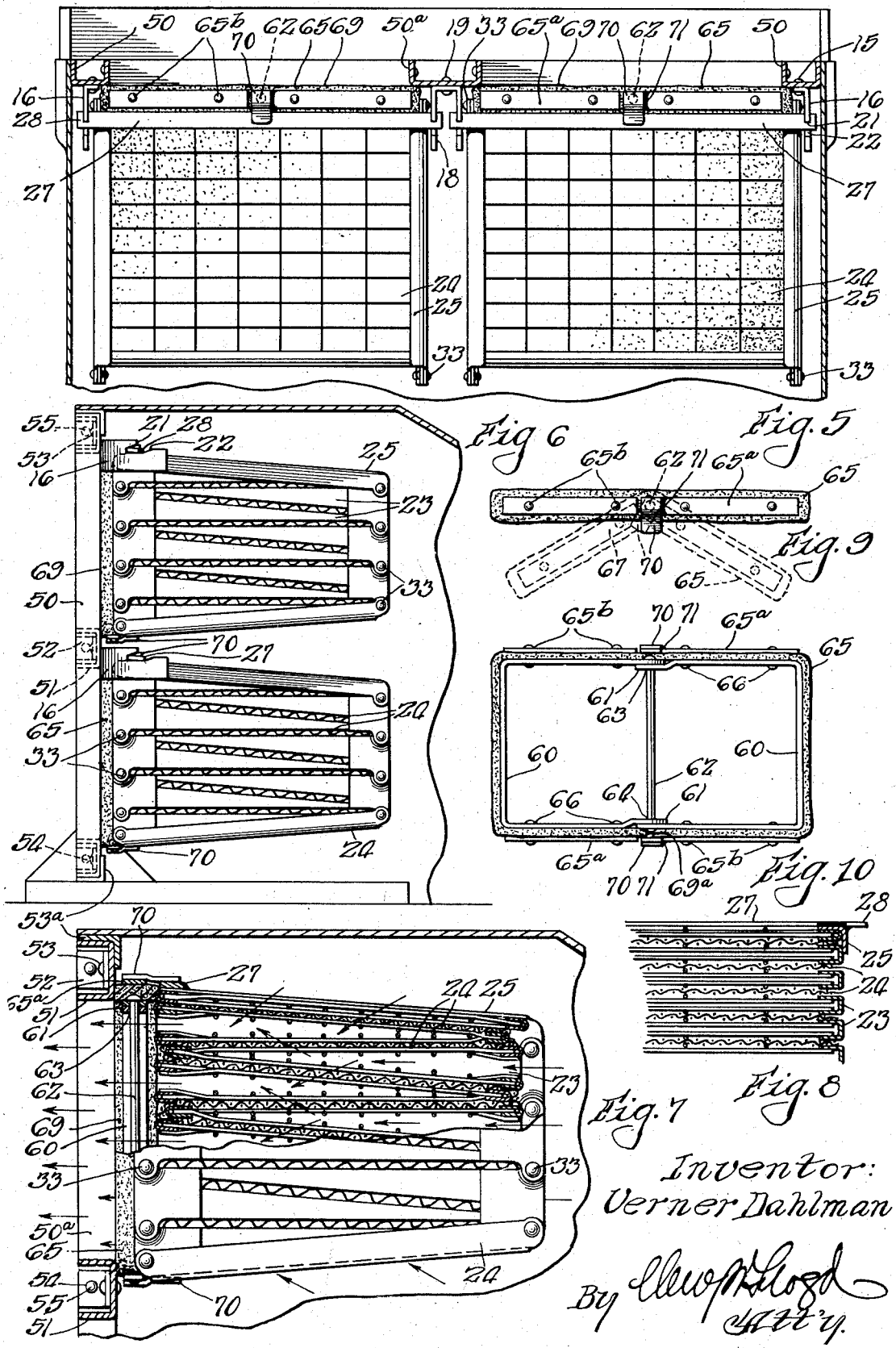

1,953,156

UNITED STATES PATENT OFFICE 1,953,156

AIR FILTER

Verner Dahlman, New Lenox, Ill., assignor to Independent Air Filter Company, Chicago, Ill., a corporation of Illinois Application June 29, 1931, Serial No. 547,639

5 Claims. (Cl. 183—71)

The present invention relates to an air filter and has to do particularly with vertical standards therefor, there being intermediate the standards horizontal channels to provide an aperture over which may be fitted air filter units, the units depending from brackets attached to said standards. More especially, the invention relates to a seal to be placed intermediate the support and a filter unit for the purpose of preventing seepage of air therebetween, the filter in some instances fastening the filter parts against separation.

In a previous application, the present application illustrated a filter composed of oppositely hinged leaves or spacers folding upon one another and having a continuous strip of filter material therebetween. Such device when completely folded is presented transversely to an air column so that a single filter surface of maximum area is furnished. This same general structure is illustrated in the filter unit which comprises one of the parts of the present invention.

In such previous application, the applicant has shown such filter unit in a pigeon hole or honeycomb support or upon a shelf. When the air stream to be filtered required the use of more than one filter unit, previously the applicant had provided filter casings suitably secured to standards or shelves also secured to standards to completely traverse the intake of the air channel, all of the air moving through the channel passing through one or another of the filter units. In the previous application, the applicant has directed his attention primarily toward a filter unit per se, while in the present application, the support for the filter and the seal therefore is of greater importance.

The primary object of the present invention, therefore, is to provide a standard in association with the apertures, through which air to be filtered passes, having brackets or the like upon which to hang units, each unit to cover one aperture.

A second object of the invention is to so assemble a standard and filter units so that the number of elements obstructing the passage of air are reduced to a minimum. The steel or iron work comprising the standard and transverse members presents a small area to an air column and is just sufficient to provide space between filter units so that these may be independently and readily removed from the standards. Carrying out the same idea, the filter units hang upon the standards and do not rest upon trays which prevent the air from penetrating upwardly through the bottom layer of the filter, or in a pigeon hole which prevents air from reaching the filter except from one face thereof. Inasmuch as each filter unit is no more than a framework for holding filter material, the passage of air through the filter is promoted by reason of the fact that the air completely surrounds the filter and is open thereto except on the discharge side thereof, where in previous forms the air could approach the filter from one side, or from one side and the top only, or in some restricted manner.

Incidental to these two objects is a third object which aims to furnish an air tight seal intermediate each standard and a filter unit depending therefrom. This object is attained in one of several ways. The seal may be permanently fastened to a standard; or parts of the seal may be permanently fastened to the standard and other parts may be independent of the standard; or parts of the seal may be permanently fastened to the side of the filter unit adjacent to the standard; and, finally, the seal may be a unit entirely independent of either the standard or the filter unit.

A fourth object of this invention is to provide a seal with a novel handle provided with an expansion means whereby a seal may be attached to one side of a filter unit or withdrawn therefrom with ease.

A fifth object is to utilize a sealing unit, which may be independent of both the filter unit and the vertical support, or which may be a part of the unit, as a means of locking the leaves of the filter unit in position.

A sixth object is to provide in a supporting bracket from which an air filter depends, a cam which with the aid of gravity guides such air filter against the standard so as to press the sealing material tightly against the filter supporting standard or member.

These objects, and such other objects as may hereinafter appear, are obtained by the novel construction, unique arrangement, and improved combination of the several elements which constitute the two embodiments of the invention illustrated in the accompanying drawings, in which:

Figure 1 is a plan view of a vertical support having two filter units hanging side by side therefrom;

Figure 2 is a vertical cross section of a standard having three filter units depending therefrom;

Figure 3 is an enlarged vertical cross section of inside upper and lower corners of a filter unit in contact with the vertical standard;

Figure 4 is a cross section of the upper corner of one of said filter units showing the locking strip thereon partially raised;

Figure 5 is a plan view of a second type of vertical support and two filter units hanging side by side therefrom;

Figure 6 is a vertical cross section of such second type of vertical standard and two filter units depending therefrom;

Figure 7 is an enlarged vertical cross section of the upper part of a filter unit of the second type;

Figure 8 is a fragmentary cross section of a filter showing the manner in which the sealing member engages the spacers of a filter unit;

Figure 9 is an elevation of the sealing member, dotted lines showing the position thereof preliminary to attachment to a filter unit; and Figure 10 is a plan view of said independent sealing member.

Like reference characters are used to designate similar parts in the drawings and in the description of the invention hereinafter given.

For reasons which will appear hereafter, two forms of the device are shown in the drawings. The first form is illustrated in Figures 1, 2, 3, and 4. In Figure 1, the numeral 10 indicates vertical angle iron end supports and the numeral 11 indicates a vertical U-shaped intermediate support. These supports 10 and 11 may be mounted on a suitable wooden frame 12 or they may be fastened together by horizontal cross strips 13 attached to members 10 and 11. Any other suitable structural arrangement may be provided therefor.

Horizontal cross bars 13 (see Figure 3) on the adjacent parallel flanges of members 10 and 11 are arranged at equal distances from one another, thus forming between standards 10 and 11, rectangular openings over each of which a filter unit depends. The cross bars 13 may have attached thereto a compressible, substantially air impervious material 14. This material generally is a heavy felt. Attached to members 10 and 11 by rivets 15 or other fastening members are brackets 16 having outwardly slightly flaring ends 17.

As has been stated above, the U-shaped standard 11 is a double angle iron or a channel member, because, being intermediate two columns of filter units, it is necessary for it to support a double bracket and it must at each side support ends of transverse members 13. Such double supporting bracket is designated 18 and is fastened to channel member 11 by rivet 19. Said bracket has two inwardly pointing ends 20. Such brackets 16 and 18 are both uniform in that each has cut therein an angular slot 21 having a camming face 22 on the outer side of the slot.

Any suitable filter unit may be hung upon brackets 16 and 18. The filter unit shown is generally of a design which has been described in previous applications for Letters Patent filed by the applicant, and consists of two oppositely pivoted series of leaves 23 folding toward and over each other. A continuous strip of filter material 24 is intermediate said leaves. The uppermost leaf 25 of each filter unit is the outermost leaf of the unit and said leaf folds so that its outer end 26 is adjacent to the standards 10 and 11 when in use thereon.

A bar 27 extends across the free edge of said leaf and is fastened thereto by rivets 27a. Each bar 27 possesses projecting ends 28. Pivotally fastened to the end of upper leaf 25 by rivet 29 are strips 30 each having an inwardly directed lip 31 at the free end thereof. Said lip 31 is adapted to cammingly engage the bottom-most leaf 23a of a filter unit at its rounded end 32. The distance from pivot 29 to the inner face of lip 31 is such that when the lip 31 engages the rounded end 32, the stack of leaves 23 at their pivoted ends 33 must be tightly compressed and force must be applied to force locking strip 30 into position, which position it maintains because of its frictional engagement. When strip 30 is locked over end 32, the leaves 23 of the filter unit are locked to one another and against separation.

The locked filter unit may then be hung upon brackets 16 and 18, the projecting ends 28 fitting into slots 21. By utilizing the cam face 22, the filter unit is guided toward the standards 10 as it moves angularly downwardly with said slots as a pivot. In so doing the top and bottom edges of the unit press against the sealing material on the transverse members 13 while the sealing material sealed to strips 30, which at its edges engages the pivot ends 33, presses against the standards 10 and 11, as later described.

It is immediately apparent that the efficiency of the device in part depends upon the effectiveness of the seal intermediate the filter unit and the standards and cross members. The differences between the forms of the device as shown in the drawings is controlled by the difference in the seals utilized in their structure. In the first form of the device there appears, as mentioned heretofore, cross bars 13 with compressible material 14 secured thereon. The upper and lower inward corners of the filter unit press against such sealing material 14 and prevent seepage of air through this contacting area.

Vertical sealing is obtained by lining the inner flange of the locking strip 30 with a strip 34, also of compressible, air impervious material. This strip of material 34 is fastened to a flange 35 on strip 30 by eyelets 36. When the filter unit is properly seated in slots 21, the sealing material 34 engages the adjacent face of standards 10 and 11 and is bent at right angles to the fastening on flange 35. This action insures a tight seal for the contacting edges. In the first form of the device, the seal is constructed partly on the vertical standards and partly on the filter unit or upon a locking device for the filter unit.

Attention is directed to the fact that the cross bars 13 with their compressible material 14 are so placed that one serves as a seal for two filter units. As may be seen from Figure 3, the lower corner 37 of an upper filter unit engages the upper part of the cross bar and compressible material 14 is compressed at 38, while the upper corner of a lower filter unit 39 engages the lower section of the compressible material 14 at area 40.

The seal intermediate the filter and the vertical standard may be varied by placing sealing material vertically along the opening of the horizontal channel through the vertical standard, so that the entire seal is on the vertical standard; or the horizontal strips of sealing material may be placed on the upper and lower inward edges of the filter unit, so that the entire seal is permanently attached to that unit. As will be seen in the description hereafter, the standard and filters may assume different forms so that other seals than those described may be desirable.

The second form of the invention illustrated in the present application is shown in the remaining six figures, Figures 5, 6, 7, 8, 9 and 10. The vertical standard has been materially altered for the purpose of accommodating a seal which is a unit independent of both the filter unit and the vertical standard. Such an arrangement suggests advantages under certain conditions over the first form of the device in that U-shaped studs and U-shaped cross bars may be used to form the filter support so that the side of the standard having a flat face may be faced toward the brackets supporting the filters. Each filter unit will be freed from a locking sealing strip which is an integral part of the unit. The independent seal provided in the second form of the invention is interchangeable, is inexpensive, is quickly replaced, and has features which are utilized to hold the leaves of the filter unit together.

In the drawings, the numerals 50 and 50a indicate vertical steel U-standards of different widths, the standards 50 being end members and the standard 50a being an intermediate member. Said standards are maintained in parallel position by horizontal U-shaped bars 51 which have brackets 52 on the inward side of their ends. Said brackets 52 are fastened to U-shaped bars 51 by spot welding 53 or in any other suitable manner. A protective shield 53a may be fastened across the top and bottoms of the standards 50 and 50a when desired. Said brackets 52 are fastened to the vertical standards 50 and 50a at 54 by nuts and bolts 55. The structure described forms a support for a plurality of air filters for the passage of air from one side of the supporting structure to the other.

The flat faced sides of these standards 50 have thereon brackets 16. The vertical stud 50a which is intermediate two columns of air filters has attached thereto a double bracket 18, just as in the previous described form of the invention. These brackets have the slots 21 and camming faces 22 therein. The filter units 23 are substantially the same as in the previous form of the invention excepting that the locking strip 30 is omitted.

The filter unit is seated in slot 21 in the manner described heretofore. The seal intermediate the unit and the smooth steel surface of the vertical standard is shown in Figures 9 and 10. The leaves of the filter unit are locked together by the said device shown in said Figures 9 and 10.

In Figure 10, the numeral 60 indicates duplicate U-shaped steel strips having in one side thereof an off-set section 61. Said U-shaped strips are fitted into each other oppositely and complementally, as seen in Figure 10, and joined by a bar 62 passing through holes 63 and 64 in said U-shaped members to provide pivots for limited relative movement of the parts 60. Riveted ends may be used on the outer extremities of said member 62 to hold it in place. The two strips 60 form a rectangular frame which possesses a length slightly less than the distance between the two vertical columns of spacer pivoting units 33 in the filter 23. Surrounding the frame and on the outer side thereof is a strip of compressible, air impervious material 65 fastened to the ends of said frame by eyelets 66 and to the sides thereof by thin short strips 65a which squeeze tightly the sealing material to the sealing frame by eyelets 65b. Other fastening means could be substituted. The sealing members 60 are placed in angular position (dotted lines, Figure 9) preliminary to attachment to a filter unit, and then flattened out to the position shown in the full lines in said figure whereupon the compressible material 65 will engage the inside of the columns of pivoted spacer holding members 33 of the filter unit 23.

By pressing upon the rod 62, an expanding and flattening effect will be exerted on the frame, and its ends will press against the end corners of unit 23. A tight seal is thus obtained, as between the seal itself and the filter unit.

It will be noticed that the sealing material 65 projects away from the filter unit. The overlap is indicated by the numeral 69. It should also be stated that the material, being continuous across at least one of the joints at point 69a, does not permit the collapsing of the sealing member to a greater extent than is shown in the position marked 67. Other limiting means may be employed when desired. At opposite sides of the sealing member are plates 70, each riveted at 71 to one of the short strips 65a of the sealing member. Said plates extend beyond the sealing member and clasp the upper and lower leaves of the filter unit 23 when the seal has been telescoped into the side of such filter unit. Thus the seal member prevents the filter unit from opening in use. The seal has the advantage of being a filter lock.

After telescoping the seal onto a filter unit, the seating of the two in a vertical standard is a simple matter and consists of a mere hooking operation. The extension arms 28 on the unit 23 engage slot 21 in brackets 16 and 18. The weight of the filter unit 23, utilizing arm 28 as a pivot in slot 21, forces the lower innermost side of the filter unit tightly against the vertical standard and, as the sealing material 65 greatly overlaps the sealing member at 69, the sealing material is compressed against the smooth surface of the vertical standard and a tight seal results.

In order to obtain a tight seal at the upper part of the filter unit, cam 22 in slot 21 is utilized. This cam guides the filter unit tightly against the face of the horizontal standard and thereby the upper part of the filter unit acquires a tight seal. The weight of the filter unit presses the lower sealing strip against the lower horizontal metal, producing a tight seal therealong. Enough space is left between filter units to permit removal of one without disturbing any adjacent filter unit. Each unit is adapted to be removed at pleasure, and the filter material replaced after the sealing member is removed. The standards and horizontal members may be assembled independently of the unit. The units may be made independently of the sealing member which latter member is interchangeable in respect to all filter units.

What I claim is new, and desire to secure by letters patent of the United States is:

1. A support having an aperture therethrough, a filter removed from said support, and a collapsible seal forming frame intermediate said filter and said support.

2. A support having an aperture therethrough, a filter unit at one side thereof, and a member intermediate said standard and filter units providing a seal therebetween and locking said filter against collapse.

3. A support having an aperture therethrough, sealing material on the edges of said aperture, a filter unit on said support in juxtaposition to said aperture, and a seal-forming frame detachably secured on said filter unit and cooperating with the sealing material on said support to provide a continuous seal intermediate said support and filter unit.

4. A sealing member for a knock-down air filter unit and comprising an adjustable frame having sealing material disposed on the perimeter thereof, said member being removably attachable to said filter unit when said unit is assembled for use.

5. A sealing member for a filter unit, and an apertured support for said unit, said member comprising a rectangular frame having sealing material thereon and adapted for telescopic union between said unit and the edge of the material of said support adjacent an aperture therein.

VERNER DAHLMAN.